United States Patent
Crisp et al.

(10) Patent No.: US 6,197,919 B1
(45) Date of Patent: Mar. 6, 2001

(54) RESINS OF AMPHOTERIC ALDEHYDE POLYMERS AND USE OF SAID RESINS AS TEMPORARY WET-STRENGTH OR DRY-STRENGTH RESINS FOR PAPER

(75) Inventors: Mark T. Crisp, Amersfoort (NL); Richard J. Riehle, Wilmington, DE (US)

(73) Assignee: Hercules Incorporated, Wilmington, DE (US)

( * ) Notice: Subject to any disclaimer, the term of this patent is extended or adjusted under 35 U.S.C. 154(b) by 0 days.

(21) Appl. No.: 08/866,364

(22) Filed: May 30, 1997

(51) Int. Cl.$^7$ .................................................. C08G 2/00
(52) U.S. Cl. .............................................................. 528/230
(58) Field of Search ........................ 526/315; 162/168.1; 528/230, 261, 270; 525/398, 400, 401

(56) References Cited

U.S. PATENT DOCUMENTS

| | | | |
|---|---|---|---|
| 3,317,370 | 5/1967 | Kekish | 162/168 |
| 3,410,828 | 11/1968 | Kekish | 260/67.5 |
| 3,607,622 | 9/1971 | Espy | 162/167 |
| 3,728,214 | 4/1973 | Espy | 162/167 |
| 4,035,229 | 7/1977 | Rave | 162/164 EP |
| 4,079,043 | 3/1978 | Rave | 260/72 R |
| 4,079,044 | 3/1978 | Rave | 260/72 R |
| 4,082,730 | 4/1978 | Rave | 260/72 R |
| 4,508,594 | 4/1985 | Jansma et al. | 162/135 |
| 4,603,176 | 7/1986 | Bjorkquist et al. | 525/329.4 |
| 4,605,718 | 8/1986 | Jansma et al. | 526/240 |
| 4,675,394 | 6/1987 | Solarek et al. | 536/43 |
| 4,703,116 | 10/1987 | Solarek et al. | 536/104 |
| 4,731,162 | 3/1988 | Solarek et al. | 162/175 |
| 4,741,804 | 5/1988 | Solarek et al. | 162/175 |
| 4,866,151 | 9/1989 | Tsai et al. | 527/300 |
| 4,981,557 | 1/1991 | Bjorkquist | 162/168.2 |
| 5,008,344 | 4/1991 | Bjorkquist | 525/328.2 |
| 5,085,736 | 2/1992 | Bjorkquist | 162/168.2 |
| 5,138,002 | 8/1992 | Bjorkquist | 526/264 |
| 5,401,810 | 3/1995 | Jansma et al. | 525/385 |
| 5,490,904 | 2/1996 | Jansma et al. | 162/168.2 |
| 5,567,798 | 10/1996 | Dulany et al. | 528/332 |

FOREIGN PATENT DOCUMENTS

| | | | |
|---|---|---|---|
| 418917 | 3/1991 | (EP) | 69/60 |
| 580529 | 1/1994 | (EP) | 21/10 |
| 672787 | 9/1995 | (EP) | 21/20 |
| 6-199965 | 7/1994 | (JP) . | |
| 62299599 | 6/1995 | (JP) . | |

OTHER PUBLICATIONS

Derwent Abstract of European Patent Application EP 580529 A. (1994).
Derwent Abstract of Japanese Patent Application JP 62299599 A. (1984).
Derwent Abstract of Japanese Patent Application JP 6199965 A. (1996).

*Primary Examiner*—Duc Truong
(74) *Attorney, Agent, or Firm*—Robert P. O'Flynn O'Brien; Gary A. Samuels

(57) ABSTRACT

This invention relates to resins useful for imparting dry-strength and temporary wet-strength to paper, the process of incorporating these resins into paper and the paper produced containing the resins. The resin comprises an amphoteric polymer produced through polymerization of an anionic monomer, a monomer containing aldehyde functionality and a cationic monomer.

48 Claims, 3 Drawing Sheets

EFFECT OF MOLECULAR WEIGHT ON WET STRENGTH AND WET STRENGTH LOSS.
HANDSHEETS (pH 5.5, 1.0%, NATURAL AGING)

HANDSHEETS (pH 7.5, 1.0%, NATURAL AGING)

EFFECT OF MOLECULAR WEIGHT ON WET STRENGTH AND WET STRENGTH LOSS.

RESINS OF AMPHOTERIC ALDEHYDE POLYMERS AND USE OF SAID RESINS AS TEMPORARY WET-STRENGTH OR DRY-STRENGTH RESINS FOR PAPER

FIELD OF THE INVENTION

This invention relates to resins useful for imparting dry-strength and temporary wet-strength to paper, the process of incorporating these resins into paper and the paper produced containing the resins.

BACKGROUND OF THE INVENTION

It is known to add certain resins to paper, usually during the paper-making process, to improve wet and/or dry-strength of paper. The type of resin added depends on the properties desired in the final paper product. For tissue, toweling and certain other applications, it is desirable that a strengthening resin be added to the paper in order to impart dry and temporary wet-strength.

In commercial and industrial towel markets and tissue markets there is a need for wet-strength resins which have high initial wet-strength and a large and fast decay rate (i.e., temporary wet-strength). It is desirable that papers containing temporary wet-strength resins lose much of their strength on prolonged immersion in water such as on disposal in sanitary systems. It is also desirable that broke containing temporary wet-strength resins be easily reprocessed into paper during the papermaking process.

Resins have been based upon polyacrylamide/glyoxal resins which have been found to impart wet and dry-strength to paper and paperboard. These resins impart moderate wet-strength to paper however, the wet-strength decay has been found to be inadequate. Paper containing those resins retain too much of their initial wet-strength over time when exposed to water, see U.S. Pat. No. 3,556,932 to Coscia et al. and U.S. Pat. No. 3,709,857 to Faessinger.

Other resins have been based on starch based products which contain a latent aldehyde functionality. These resins while exhibiting good wet-strength decay, exhibit only low initial wet-strength, see U.S. Pat. No. 4,866,151 and EP 0 418 917 A2.

Another approach for obtaining temporary wet-strength resins involves modifying standard cationic polyacrylamide/glyoxal resin through the inclusion of a non-nucleophilic comonomer (e.g., dimethylacrylamide), see U.S. Pat. No. 4,603,176. Still another approach involves the use of temporary wet-strength resins with nitrogen heterocyclic, non-nucleophilic functionalities (e.g., N-vinylpyrrolidinone (NVP)), see U.S. Pat. Nos. 4,981,557, 5,008,344, 5,138,002 and 5,085,736.

Another approach for obtaining temporary wet-strength resins has been through the use of wet-strength resins containing latent aldehyde functionalities. One approach involved the reaction of a cationic polyacrylamide with dimethoxyethanal instead of glyoxal. These resins were found to give comparable decay to polyacrylamide/glyoxal resins which exhibit inadequate temporary wet-strength characteristics, see U.S. Pat. Nos. 5,401,801 and 5,490,904.

Also, it is well known to add certain resins to paper, usually during the paper-making process, to improve the dry-strength of the resultant paper. It is also well known that certain dry-strength additives result in an increase in a paper's wet-strength and visa versa. However, it is not always desirable that paper with increased dry-strength also exhibit an increased wet-strength since increasing a paper's wet-strength makes paper more difficult to repulp. Difficulties exist when reclaiming or recycling paper back to its individual fibers when conventional resins have been used to impart strength to the paper. Achieving de-fibering of these papers involves a process of exposing the papers to sufficient heat and under proper chemical conditions to initiate or maintain amide hydrolysis, while subjecting the papers to forces for breaking apart fiber networks contained in the papers without significantly damaging the fibers themselves.

Many polymers that improve a paper's dry-strength are anionic under normal papermaking conditions, e.g., sodium carboxymethylcellulose, carboxymethyl guar, and copolymers of acrylamide and acrylic acid or sodium acrylate. A cationic compound may be used to retain these anionic substances on the pulp fibers which are themselves anionic by nature. These cationic compounds may be wet-strength agents such as polyaminoamide-epichlorohydrin resins, highly cationic polymers such as poly (diallyldimethylammonium chloride), polymers of dimethylamine and epichlorohydrin, modified starches, aluminum compounds, etc.

In U.S. Pat. No. 5,338,406 to Smith, a dry-strength system for a "water-soluble, linear, high molecular weight, low charge density cationic polymer having a reduced specific viscosity greater than two deciliters per gram (>2 dl/g) and a charge density of 0.2 to 4 milliequivalents per gram" with "at least one water-soluble, anionic polymer having a charge density less than 5 meq/g" is disclosed. The polyelectrolyte complex of Smith is useful as an additive for providing dry-strength to all types of paper, particularly for those papers which are produced using unbleached pulp.

In U.S. Pat. No. 5,338,407 to Dasgupta, a process for enhancement of paper dry-strength without reducing its softness is disclosed which comprises adding a mixture of an anionic carboxymethyl guar, carboxymethyl bean gum or carboxymethyl hydroxyethyl guar with various cationic additives to a bleached pulp furnish. The cationic additive may be a polyarnide-epichlorohydrin resin and, if the cationic additive is a wet-strength resin, the enhancement of the paper's dry-strength without reducing its softness is achieved. Additionally, the wet-strength of the paper is increased.

In U.S. Pat. No. 5,543,446 to Rodriguez, a water-soluble terpolymer for use as a dry-strength additive for paper is disclosed. The terpolymer comprises a reaction product of monomers consisting essentially of acrylamide or methacrylamide, an ethylenically unsaturated aliphatic carboxylic acid or a salt thereof and a water-soluble polyvinyl monomer. The resulting dry-strength additive is water-soluble for convenience of operation and readily dilutable with water and is easily miscible with papermaking fibers.

In Canadian Patent No. 1,110,019, "a process for manufacturing paper having improved dry-strength which comprises mixing an essentially alum-free pulp slurry with a water-soluble cationic polymer and subsequently adding a water-soluble anionic polymer to the essentially alum-free pulp slurry" is disclosed.

In addition to the above, polyamidoamine-epichlorohydrin resins have been used extensively as wet-strength agents for paper. Paper treated with these resins do not exhibit temporary wet-strength characteristics. These resins are typically prepared in a two-step process. In the first step, a polyamidoamine prepolymer is prepared from a diacid (e.g., adipic acid) and a polyamine (e.g., diethylenetriamine). Then in the second step, the prepolymer is reacted with epichlorohydrin in an amount equal to or greater than the amount of secondary amine groups in the prepolymer. In a subsequent step, a small amount of epichlorohydrin reacts to effect branching of the prepolymer, accompanied by an increase in molecular weight. However, a majority of the epichlorohydrin reacts with the prepolymer to give reactive functional groups, specifically, either aminochlorohydrin or azetidinium. It is well known to those skilled in the art of papermaking that the above-described cationic wet-strength resins may be used in combination with anionic acrylamides or anionic cellulose derivatives. However, papers containing these combinations exhibit increased wet-strength as well as increased dry-strength.

Therefore, the need remains for temporary wet-strength resins for use in paper which provide the paper with sufficient initial wet-strength and which exhibit a large and fast decay rate.

The need also remains for dry-strength resins for use in paper which provide paper with sufficient dry-strength and which exhibit temporary wet-strength thereby permitting paper containing the resins to be easily repulped.

SUMMARY OF THE INVENTION

The present invention relates to a resin comprising an amphoteric polymer produced through polymerization of an anionic monomer, a monomer containing aldehyde functionality and a cationic monomer. Preferably, the amphoteric polymer is produced through radical chain polymerization. The amphoteric polymer comprises a monomer mole ratio of anionic monomer to monomer containing aldehyde functionality to cationic monomer of about 5–50:10–80:5–50. Preferably, the amphoteric polymer comprises monomer mole ratio of anionic monomer to monomer containing aldehyde functionality to cationic monomer of about 10–40:20–60:10–40, more preferably about 25:50:25. Preferably, the amphoteric polymer is a terpolymer. The resin has utility for imparting either temporary wet-strength or dry-strength to paper.

The present invention also relates to a process of manufacturing paper comprising: (1) forming an aqueous suspension of cellulosic fibers; (2) adding a strengthening additive; and (3) sheeting and drying the fibers to form a desired cellulosic web. The strengthening additive comprises a resin for use in paper comprising; an amphoteric polymer produced through polymerization, preferably radical chain polymerization, of an anionic monomer, a monomer containing aldehyde functionality and a cationic monomer.

The present invention also relates to a process for producing an amphoteric polymer. The process comprises the steps of; a) providing an anionic monomer, a monomer containing aldehyde functionality and a cationic monomer to a reactor, b) adding a water-soluble initiator to the reactor, and c) permitting the anionic monomer, the monomer containing aldehyde functionality and a cationic monomer to polymerize to produce an amphoteric polymer. The process also may further comprise d) adding a chain transfer agent. The resultant amphoteric polymer comprises a mole ratio of anionic monomer to monomer containing aldehyde functionality to cationic monomer of about 5–50:10–80:5–50.

BRIEF DESCRIPTION OF THE FIGURES

FIG. 1 depicts a pair of charts showing the relative performance of various temporary wet-strength resins having different molecular weights as determined by Reduced Specific Viscosity ("RSV").

FIG. 2 depicts a pair of charts showing the relative performance of various temporary wet-strength resins.

FIG. 3 depicts a pair of charts showing the relative performance of temporary wet-strength resins in a liquid packaging board application compared to a conventional dry-strength resin system.

DETAILED DESCRIPTION OF THE INVENTION

This invention relates to a resin, its synthesis and its use in temporary wet-strength and/or dry-strength applications.

More particularly, this invention relates to amphoteric resins which are synthesized by polymerization of an anionic monomer, a monomer which contains aldehyde functionality and a cationic monomer. Preferably, the amphoteric resins are synthesized by radical chain polymerization.

As defined herein, the term "monomer" includes materials of higher molecular weights such as oligomers, as well as monomeric materials.

In applications where temporary wet-strength and/or dry-strength are desired, monomer mole ratio of anionic monomer to monomer which contains aldehyde functionality to cationic monomer is about 5–50:10–80:5–50, preferably 10–40:20–60:10–40, more preferably about 25:50:25.

The anionic monomer of use in the formation of the amphoteric resins of the invention may be any organic acid with polymerizable unsaturation. The anionic monomer of use in the formation of the amphoteric resins of the invention may be any anionic monomer which is capable of reacting through radical chain polymerization with the monomer which contains aldehyde functionality in either protected (e.g., acetal) or unprotected form (e.g., aldehyde) and the cationic monomer to form the amphoteric resins. Anionic monomers of use in the production of the amphoteric resins of the invention may be selected from the group consisting of acrylic acid, methacrylic acid, acrylamidopropane sulfonic acid (AMPS), maleic acid, fumaric acid and itaconic acid and salts thereof. The salts of the anionic monomers are preferably their sodium or potassium salts. More preferably, the anionic monomers of use in the production of the amphoteric resins of the invention are nucleophilic in nature and may be selected from the group consisting of acrylic acid, methacrylic acid, maleic acid, fumaric acid and itaconic acid and salts thereof. The salts of the anionic monomers are preferably their sodium or potassium salts.

The monomer which contains aldehyde functionality of use in the formation of the amphoteric resins of the invention may be any monomer which contains aldehyde functionality which is capable of reacting through radical chain polymerization with the anionic monomer and the cationic monomer to form the amphoteric resins. The monomer which contains aldehyde functionality may be represented by the following equation:

where "R'" may be either H or methyl, "X" may be either or —O—, "R" may be H, methyl or alkyl and "n" may be 1 to 8.

Alternatively, the monomer which contains aldehyde functionality may be found in an acetal form as represented by the following structure:

where "R'" may be either H or methyl, "R" may be H, methyl or alkyl, "R''" may independently be methyl, ethyl or alkyl, "X" may be either or —O—, and "n" may be 1 to 8.

Therefore, both aldehyde and acetal forms may be represented by the structure:

where "R'" may be either H or methyl, "R''" may independently be H, methyl, ethyl or alkyl, "X" may be either —O—, "R" may be H, methyl or alkyl, and "n" may be 1 to 8.

Preferably the monomer which contains aldehyde functionality is in a protected form (e.g., acetal), however the aldehyde functionality may also be in the unprotected form (e.g. aldehyde). While the aldehyde functionality is in a protected form, the amphoteric resin is more stable and less likely to experience crosslinking resulting in gelation and increased viscosity of the amphoteric resin. The acetal functionality is easily converted into its aldehyde and active form through addition of acid to the resin. Preferably, the monomer which contains aldehyde functionality is N-(2,2-dimethoxyethyl)-N-methylacrylamide (DMEMA). Other examples of the monomer which contains aldehyde functionality may be selected from the group consisting of acrolein, methacrolein, 3,3-dimethyloxypropyl acrylamide, 3,3-diethoxypropyl acrylamide, 3,3-dimethoxypropyl methacrylamide, 2,2-dimethoxy-1-methylethyl acrylate, 3,3-dimethoxypropyl methacrylate, 2-(acryloylamino)-ethanol dimethyl acetal, 3-(methacryloylamino)propanal dimethyl acetal, 3-(acryloylamino)propanal dimethyl acetal, and 8-(acryloylamino)octanal dimethyl acetal, acrylamidobutyraldehyde diethyl acetal, acrylamidobutyraldehyde dimethyl acetal, N-(2,2-dimethoxyethyl) methacrylamide, N-(2,2-dimethoxyethyl)-N-methyl-methacrylamide, 2,2-dimethoxyethyl-methacrylate, and 2,2-diethoxyethyl-methacrylate.

Suitable monomers which contain aldehyde functionality are listed in U.S. Pat. Nos. 4,508,594 and 4,605,718, the disclosures of which are incorporated herein by reference.

The cationic monomer of use in the formation of the amphoteric resins of the invention may be any cationic monomer which is capable of reacting through radical chain polymerization with the anionic monomer and the monomer which contains aldehyde functionality to form the amphoteric resins. The cationic monomer may be represented by the following structure:

where "R'" may be either H or methyl, "R" may be H, methyl or alkyl, "R''" may independently be H, methyl, ethyl or alkyl, "X" may be either N(R) or O and "n" may be 1 to 8. "Z$^-$" represents an anionic counter ion associated with the cationic monomer, such as Cl$^-$, Br$^-$, I$^-$, NO$_3^-$, CH$_3$OSO$_3^-$, HSO$_4^-$, and ClO$_4^-$. Preferably, Z is Cl$^-$.

The cationic monomer may be a member selected from the group consisting of [2-(methacryloyloxy)ethyl] trimethylammonium chloride (MTMAC), dimethylaminoethyl methacrylate (DMEAMA), dimethylaminopropyl methacrylamide (DMAPMA), [3-(methacryloylamino)propyl] trimethylammonium chloride (MAPTAC), diallyldimethylammonium chloride (DADMAC), acryloyloxyethyltrimethylammonium chloride, and [2-(methacryloyloxy)ethyl]trimethylammonium methylsulfate.

Synthesis of the polymers of the instant invention can be accomplished through many different known methods, including but not limited to solution, bulk, emulsion or suspension polymerization. Preferably, synthesis of the polymer involves radical chain polymerization in an aqueous solution of the anionic monomer, the monomer containing aldehyde functionality and the cationic monomer at temperatures of about 10° C. to about 100° C., preferably 25° C. to about 80° C., more preferably at about 50° C. to about 70° C. The time for polymer synthesis is for about 1 hours to about 24 hours, preferably 2 hours to about 12 hours, most preferably about 2 to about 8 hours using a water soluble initiator. The water soluble initiators are free radical initiators which include, but are not limited to, thermal initiators, redox couples, and photochemical initiators. More preferably, the water soluble initiator comprises water soluble azo initiators.

Additionally, a chain transfer agent may be used in the process for the production of the polymers of the invention. Suitable chain transfer agents is selected from the group consisting of beta-mercaptoethanol, 1-dodecanethiol, 1,2-propanediol, thioglycolic acid, glycerol, acetone, and iso-propanol. Other suitable chain transfer agents include, but are not limited to, those described in *Polymer Handbook*, 3rd edition, J. Brandrup and E. H. Immergut, editors, Wiley-Intersciences (New York), (1989), pp. II-94 through II-133, incorporated by reference herein. Preferably, the chain transfer agent is selected from the group consisting of beta-mercaptoethanol, glycerol, 1,2-propanediol, and isopropanol. More preferably, the chain transfer agent comprises isopropanol. The chain transfer agent may be added as an aqueous solution, for example from about 1% to about 30% isopropanol in water, preferably from about 1% to about 10% isopropanol in water, more preferably about 2% to about 5% isopropanol in water, at pH of about 3 to 9, preferably pH of about 4 to about 8, most preferably a pH of about 5 to about 7.

The resultant polymer is allowed to reach to ambient temperature. Depending on the percent solids of the polymer produced in the polymerization, the percent solids of the polymer to be used to provide wet or dry-strength to the paper may be adjusted through addition or removal of solvent (usually water) to the polymer. The percent solids of the polymer may be from about 1% to about 100%, more preferably from about 5% to about 50%, more preferably from about 15% to about 40%. The synthesis may be performed in a batch, semi-continuous, or continuous process. The monomers may be added to one another in any random manner to form the polymer of the invention.

The molecular weight of the polymer can be modified by changing the solids, the amount of initiator, the amount of chain transfer agent and/or any other method used by those skilled in the art.

Herein, molecular weight may be expressed in terms of the resin's reduced specific viscosity ("RSV") of 2% resin in 1M aqueous $NH_4Cl$ at 25° C.

The resin's RSV was determined using the following method. RSV of a 2% solution of the resin in 1M ammonium chloride is determined at 25° C. by means of a Ubbelohde viscometer and a Brinkmann Viscotimer. Flow times of the 2% resin solution and the pure solvent are measured and the relative viscosity (Nrel) calculated. The reduced specific viscosity is calculated from the relative viscosity. This method is based on ASTM D446.

Apparatus (1) Ubbelohde Viscometer tubes, No. 1, with Viscometer Constant C = 0.01 - available from Visco Systems, Yonkers, NY, or Schott, Hofheim, Germany, or Brinkmann Instruments.
(2) Brinkmann Viscotimer C - available from Brinkmann Instruments Inc., Cantiague Rd., Westbury, NY 11590.
(3) Ubbelohde Viscometer Support - ibid., Cat. No. 21-00-032-9.
(4) Constant temperature water bath maintained at 25 +/- 0.1° C. Cooling capability (cold water or ice pack) may be necessary to maintain constant temperature. An ASTM 45C thermometer should be used to monitor the temperature near the viscometer tube mounting location.
(5) Volumetric flask, 50 mL, Class A.
(6) Beaker, 10 mL.
(7) ASTM 45C thermometer, calibrated, designed for measurements at 25° C. with 0.05 degree divisions - available from VWR Scientific, Cat. No. 61118-923, or equivalent.
(8) Source of vacuum - Preferably a water aspirator for cleaning of viscometers.
(9) Filter or stainless steel screen, ca. 100 mesh.

Reagents (1) Ammonium chloride, granular. ACS reagent grade.
(2) Solvent (1M ammonium chloride). Add 53.5 +/- 0.1 g of NH4Cl to a 1-liter volumetric flask, dilute to volume with distilled water and mix.

The resins of the instant invention, when used to impart temporary wet-strength to paper, may have RSV values of less than about 1.5 dL/g, preferably between about 0.5 to about 1.5 dL/g, more preferably between about 0.6 to about 1.2 dL/g.

Alternatively, the molecular weight of the resins may be expressed as $M_W$ as determined through size exclusion chromatography using the following method.

Apparatus (1) Hewlett Packard 1050 HPLC
    Vacuum Degasser
    Isocratic pump (flowrate = 0.25 ml/min)
    Autosampler (injection volume = 20 μl for standards, 50 μl for samples)
(2) Hewlett Packard 1047A RI-detector
(3) Columns: SynChropak
    Catsec 100 (250 × 4.6 mm)
    Catsec 300 (240 × 4.6 mm)
    Catsec 1000 (250 × 4.6 mm)
    Catsec 4000 (250 × 4.6 mm)
    Column temperature = 40° C.
(4) Software: Polymer Laboratories Caliber version 6.0

The eluent used was solution of 0.2M lithium acetate (LiAc)/0.2M acetic acid (HAc)/2% ethylene glycol (pH 4.5). The flow rate marker was acetic acid.

A calibration curve for the system is prepared by injecting a solution of polymer standards. The standards used are various polyethylene glycols (molecular weights from 106 to 22,800) and various polyethylene oxides (molecular weights from 32,600 to 1,702,000). A combination of these standards was made up in the eluent (6.7 mg/ml) to which 7.5 μl of the flowrate marker was added. The solution was filtered through a 0.45 μm filter and then injected onto the column.

The resins were prepared for analysis by dissolving 6.5 mg of dry resin in 1.5 ml of eluent and adding 5 μl of the flowrate marker. This solution was filtered through a 0.45 μm filter and then injected onto the column.

The molecular weight distributions were determined by comparison against the calibration curve and the $M_w$ values calculated.

Generally, the molecular weight of the resins may be of the range from about 50,000 to about 2,000,000 $M_W$. In temporary wet-strength applications, the resins preferably have molecular weights in the range of about 75,000 to about 500,000 $M_W$, more preferably about 150,000 to about 350,000 $M_W$. For dry-strength applications, the resins preferably have molecular weights in the range of about 100,000 to about 1,000,000 $M_W$, more preferably about 400,000 to about 700,000 $M_W$.

Generally, the process of manufacturing paper comprises three principal steps: (1) forming an aqueous suspension of cellulosic fibers; (2) adding a strengthening additive, such as a wet-strength and or dry-strength resin; (3) sheeting and drying the fibers to form a desired cellulosic web.

The first step of forming an aqueous suspension of cellulosic fibers is performed by conventional means, such as known mechanical, chemical and semichemical, etc., pulping processes. After mechanical grinding and/or chemical pulping step, the pulp is washed to remove residual pulping chemicals and solubilized wood components. These steps are well known, as described in, e.g., Casey, Pulp and Paper (New York, Interscience Publishers, Inc. 1952).

The second step may be carried out by adding the strengthening additive directly to the papermaking system. Individual components and blends of components may be in a dry form or they may be in aqueous systems.

The third step is carried out according to conventional means, such as those described in e.g., Casey, Pulp and Paper (New York, Interscience Publishers, Inc. 1952).

The resins of the invention may be added to in the papermaking process at any point in the process where wet-strength resins are presently added, and preferably the resins are added to the paper as aqueous solution. The wet-strength resins can be added at any time before, during or after the paper is formed. For example, the resin can be added before or after the refining of the pulp, at the fan pump or head box, or by spraying on the wet web. The resin can also be added to preformed paper by tub sizing or spraying on the dried paper sheets. In most commercial papermaking, it is preferred to add the resin at the fan pump or head box in the form of an aqueous solution. Various amounts of resin can be used. The actual amount of resin used in the paper can be easily determined by one skilled in the art.

Further, the invention pertains to a process of repulping paper. This process can include the steps of providing paper which comprises the amphoteric polymer of the invention, and forming a slurry comprising water and pulp prepared from the indicated paper. The invention further pertains to the process of making paper from pulp prepared according to the foregoing repulping process, and to paper made from this pulp.

In temporary wet-strength applications, as well as in dry-strength applications, typically about 0.05 to about 5% of the resin is added to the paper on a dry basis. Preferably, about 0.1 to about 2% of the resin is added to the paper on a dry basis. More preferably, about 0.2 to about 1% of the resin is added to the paper on a dry basis.

The amphoteric aldehyde polymers have been shown to improve dry-strength in the following applications: liquid packaging board, recycled liner board, newsprint, and light-weight coated papers.

For the liquid packaging board application, the amphoteric aldehyde polymer may have a monomer molar ratio of about 5–50:10–80:5–50, anionic:aldehyde:cationic, respectively. In one embodiment for liquid packaging board application, the amphoteric aldehyde polymer is synthesized from methacrylic acid MAA), N-(2,2-dimethoxyethyl)-N-methylacrylamide DMEMA and [2-(methacryloyloxy)ethyl] trimethylammonium chloride (MTMAC).

Other ingredients can be used in conjunction with the resins of this invention. The additives or ingredients commonly used in papermaking can be used here also as for example alum, rosin size, coating colors, mineral fillers, starch, casein, etc. The presence of other ingredients is not essential to this invention and excellent results are achieved when using only the resins of this invention.

It will be obvious to those skilled in the art that the resins of this invention can be incorporated into various types of paper such as kraft paper, sulfite paper, semichemical paper, etc. both bleached and unbleached. While the resins can be used in various types of paper, their temporary wet-strength advantages will be most sought in paper toweling or paper tissues such as toilet and facial tissues. For among the advantages of the use of the resins of this invention as a dry-strength additive, it was found that these resins were useful in increasing the dry-strength of paper in liquid packaging board applications, recycled liner board, newsprint and light weight coated paper.

The following examples will serve to illustrate the invention, parts and percentages being by weight unless otherwise indicated.

EXAMPLE 1

Synthesis of Monomer Containing Aldehyde Functionality

This example describes preparation of a monomer containing aldehyde functionality for use in production of amphoteric aldehyde polymers.

All glassware used in the synthesis of the monomer containing aldehyde functionality was dried in a 110° C. overnight and assembled hot under a stream of nitrogen. A 5-neck, 3-L, round-bottom flask was fitted with a 1-L pressure-equalizing addition funnel, an overhead mechanical stirrer with a glass shaft and a polytetrafluoroethylene (PTFE) paddle, a dry nitrogen inlet and a temperature probe. To the flask was charged a solution of 188.56 g (2.0 moles, corrected for nominal assay of 96%, FW=90.51) of acryloyl chloride (Aldrich Chemical Co.) in 1450 mL of toluene. To the addition funnel was added a solution of 238.32 g (2.0 moles, not corrected for nominal assay of 97%, FW=119.16) of methylaminoacetaldehyde dimethyl acetal (Aldrich Chemical Co.) and 212.5 g (2.10 moles, not corrected for nominal assay of 99%, FW=101.19) of triethylamine ("TEA") in 360 mL of toluene. The stirred solution in the flask was cooled to 0° C. with an ice/calcium chloride bath. The amine solution was added dropwise to the acryloyl chloride solution at a rate to maintain −5 to 3° C. After 2.5 h, the addition was complete. The slurry had a slight yellow haze. The reaction mixture was allowed to warm to room temperature and allowed to stand overnight. (The reaction is essentially complete when it reaches room temperature.) The reaction for the production of the monomer containing aldehyde functionality is represented by the following:

DMEMA

The reaction mixture was filtered on a coarse flitted Buchner funnel. The resultant salt was washed with three 700-mL portions of toluene. The filtrates were combined and stabilized with 500 ppm (0.18 g) of phenothiazine. The solvent was removed from the combined filtrates with a rotary evaporator and then with magnetic stirring under full pump vacuum to give 327.4 g (94%) of crude N-(2,2-dimethoxyethyl)-N-methylacrylamide (DMEMA). Analysis by $^1$H NMR showed that the crude product had a purity of about 95%. The impurities included 1.1 mole % toluene, about 1 mole % of acrylic acid and 1.5 mole % of starting material, methylaminoacetaldehyde dimethyl acetal. (Note: In the $^1$H NMR spectrum, the two "tautomers" of the amide are clearly visible.) The crude product was further purified by fractional vacuum distillation using an apparatus with a fraction cutter and a vacuum jacketed 20-cm Vigreux column. For the distillation, the first drops of distillate formed at a pot temperature of 90° C. and at 0.2 torr. During the distillation, the pot temperature increased to 100° C. and the vacuum improved to 0.1 torr. The first fraction (13.3 g), which contained toluene, acrylic acid and DMEMA, was discarded. The second fraction (17.3 g) contained about 5 mole % acrylic acid and the remainder was DMEMA. The next fraction (262.3 g, 76%) distilled with a head temperature of 66–68° C. at 0.1 torr. This fraction of DMEMA had about 99% purity. It was stabilized with 100 ppm of MEHQ (4-methoxyphenol) and used in subsequent polymerization reactions. The pot residue (28.5 g) was about 50% DMEMA and the remainder was several other impurities.

EXAMPLE 2

Synthesis of Amphoteric Aldehyde Polymers

This example describes preparation of an amphoteric aldehyde polymer of the invention.

A tared 250-mL 4-neck round-bottom flask was fitted with (1) an overhead mechanical stirrer connected to a glass stirrer shaft and a polytetrafluoroethylene (PTFE) paddle, (2) a nitrogen inlet and sparge tube, (3) a Claisen adapter fitted with a condenser, (4) a temperature probe inserted through a rubber septum and a temperature controlled water bath. To the flask was added 60.0 g of distilled water, 2.76 g of isopropanol (2% of solvent weight), and then 2.70 g (0.0375 mole) of acrylic acid (Aldrich). The flask was cooled with an ice-water bath and 14.10 g of 10% aqueous sodium hydroxide was added to obtain a pH of 5.5 at 20° C. The pH electrode was rinsed with 47.72 g of distilled water, which was added to the flask. To this solution was added 12.99 g (0.075 mole) of N-(2,2-dimethoxyethyl)-N-methylacrylamide (DMEMA) and 16.74 g (8.28 g solids, 0.0375 moles) of 49.5% aqueous [3-(methacryloylamino)propyl]trimethylammonium chloride MAPTAC) (Aldrich). Sparging of the reaction mixture with nitrogen was started and the reaction mixture was heated to 57° C. with a temperature controlled water bath. After 30 minutes total sparge time, 0.394 g (1 mole %) of a water-soluble initiator, 2,2'-azobis(2-methylpropionamidine) dihydrochloride (V-50 from Wako Pure Chemical Industries, Ltd.), in 5.00 g of deionized water was added via syringe (initial reaction solids were 15.0%). The reaction mixture exothermed to 60° C. and then was maintained at that temperature. The reaction was monitored by HPLC analysis of reaction aliquots (quenched with 500–1000 ppm of methylene blue). The nitrogen sparge was maintained throughout the reaction. Six hours after catalyst addition, the reaction mixture was cooled and 2.82 g of water was added to give 15.0% resin solids.

The synthesis of the polymer is represented by the following:

AA

DMEMA

-continued

MAPTAC

The resultant polymer was poly(acrylic acid/sodium acrylate-co-DMEMA-co-MAPTAC). The monomer mole ratio of monomers in the polymer was (25:50:25).

The pH of the final resin was 6.4, RSV of 2% resin in 1 $\underline{M}$ aqueous $NH_4Cl$ was 1.315 dL/g and the $M_W$ of the final resin was 260,850 Daltons.

EXAMPLE 3

Activation Procedure for Amphoteric Aldehyde Polymers

This example describes activation of the amphoteric aldehyde polymer of the invention which involves conversion of the polymer's acetal functionality into aldehyde functionality. (Note: With the same monomers and the same monomer molar ratios, the activation procedure is the same for dry-strength and temporary wet-strength applications.) To 200 g of the Example 2 resin, poly(acrylic acid-co-DMEMA-co-MAPTAC), was added 395.4 g of water to give 5.0% resin solids. With stirring, 24.5 mL of 5.0$\underline{M}$ aqueous HCl was added to achieve a pH of approximately 1.0. The resulting solution was heated at 40° C. for 4 hours with stirring. The pH of the resin solution was adjusted from about 1.0 to 3.0 with 10% NaOH. The resin solids was calculated based on the amount of HCl and NaOH added (disregarding the NaCl produced). The activation procedure may be represented as follows:

The resin was subsequently used within one day of its acid activation or it was stored in a glass jar sealed with a lid in a cold room at a temperature of between approximately 0° C. to approximately 10° C. for up to one week.

EXAMPLE 4

Synthesis of Amphoteric Aldehyde Polymers

In example 4A, example 2 was repeated with 5% isopropanol in water (solvent weight basis) instead of 2%. The pH of the final resin, poly(acrylic acid-co-DMEMA-co-MAPTAC) having a monomer mole ratio of (25:50:25), was 6.2, RSV of 2% resin in 1M aqueous $NH_4Cl$ was 0.956 dL/g.

In a example 4B, the process of example 2 was repeated with 10% isopropanol in water (solvent weight basis) instead of 2%. The pH of the final resin, poly(acrylic acid-co-DMEMA-co-MAPTAC) having a monomer mole ratio of (25:50:25), was 6.2, RSV of 2% resin in 1$\underline{M}$ aqueous $NH_4Cl$ was 0.647 dL/g.

Figure 1A:
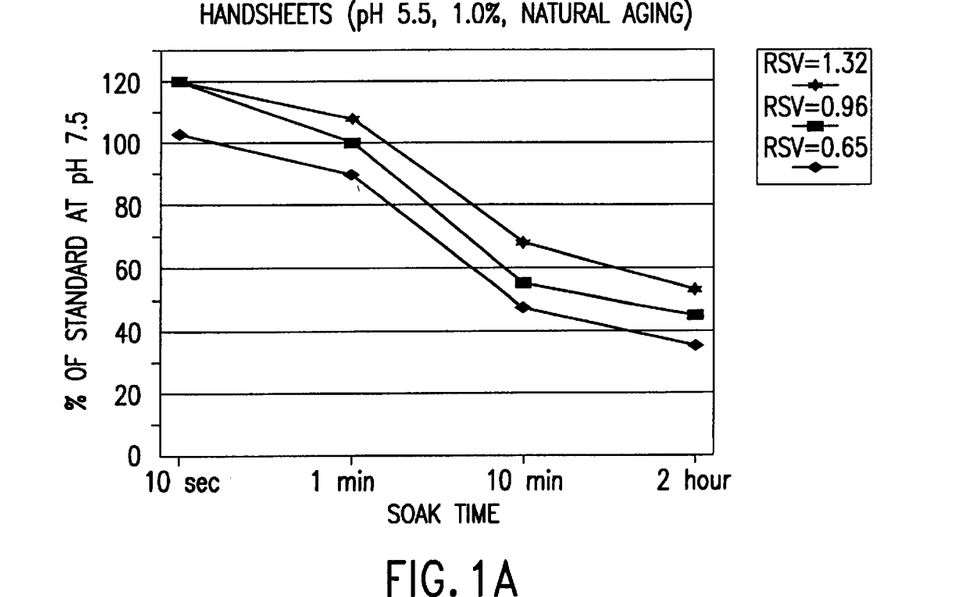
Figure 1B:
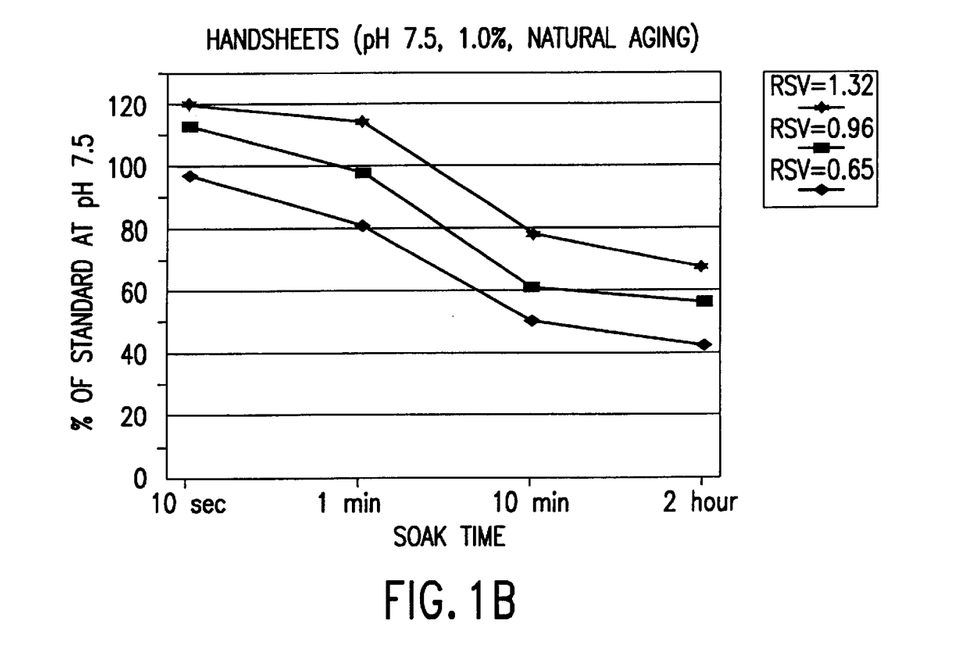

In FIG. 1, the resin of example 2 and the two resins of example 4, activated as in example 3, are listed by their RSV values. From graphs contained in this Figure, it is clear that the lower a resin's molecular weight, the lower the initial wet-strength of handsheets containing that resin as well as the lower its final wet-strength. Handsheets containing higher molecular weight resins exhibit higher initial wet-strength and higher final wet-strength.

The two above examples demonstrate the ability to modify the molecular weight of the resins by varying the amount of chain transfer agent (isopropanol) used in their production thereby modifying the initial and final wet-strengths of paper containing these resins.

EXAMPLE 5

Temporary Wet-strength Evaluation of Activated Amphoteric Aldehyde Resins

This example describes the effectiveness of the polymers as temporary wet-strength resins.

A series of amphoteric aldehyde terpolymers were synthesized as in example 2 and evaluated as temporary wet-strength resins. Acrylic acid or methacrylic acid (10–40 mole %), DMEMA (30–50 mole %) and MAPTAC or MTMAC (10–40 mole %) were polymerized at about 60° C. for approximately 6 hours using a water-soluble azo initiator in 5% isopropanol in water solvent at pH 5.5 to produce a resin. The resulting 15% solids resin was cooled and was determined to be stable to long-term storage (e.g., usable for its intended purpose after a period of time of storage). Before use, the acetal functionality of the resin was converted to aldehyde functionality (i.e., deprotected or activated) by dilution to 5% solids and heating at pH 1 at 40° C. for 4 hours, followed by raising the pH to 3 with aqueous sodium hydroxide. The resulting resins were then evaluated in handsheet experiments. See the following Table and FIG. 2 for results.

The initial wet-strength ("$WT_i$") of the samples were determined using a 10 sec. soak in water (followed by about 15 sec. to mount the paper strip and to start the tensile test). The soak water was pH 7.5 standard hard water [100 ppm hardness, 50 ppm alkalinity based on calcium carbonate]. The final wet-strength ("$WT_f$") of the samples were determined using a 2 hour soak in water. Percent wet-strength decay refers to the loss in wet tensile from $WT_i$ to $Wt_f$.

The resins of this invention and two commercial resins were compared to a standard resin, a conventional wet-strength resin (Kymene® 557H wet-strength resin, available from Hercules Incorporated, Wilmington, Del.). Percentage wet-strength decay was calculated by determining a sample's $WT_i$ and its $WT_f$ and performing the following calculation where percentage wet-strength decay=$((WT_i-WT_f)/WT_i)(100)$. Tensile strengths were determined using TAPPI Method T-494. The two comparative commercial resins were; Blocked Reactive Group starch ("BRG Starch") (Cobond 1000 starch, available from National Starch and Chemical Corporation, Bridgewater, N.J.), activated as described in U.S. Pat. No. 4,866,151 incorporated herein by reference, and Parez 631NC wet-strength resin (available from Cytec Industries, Cincinnati, Ohio)

Paper handsheets were prepared at pH 5.5 or 7.5 with 50:50 Rayonier bleached Kraft:James River bleached hardwood Kraft dry lap pulp refined to approximately 500 mL Canadian Standard Freeness ("CSF"). The handsheets were made on a Noble and Wood Sheet Machine (Noble and Wood Machine Co., Hoosick Falls, N.Y.) Sheets were generated having 30 lb/3000 sq. ft. basis weight containing 0.25–1.0% of resin (resin solids basis, based on the unactivated resin). The paper was allowed to age for two weeks at standard temperature and humidity before testing.

| Resin | Monomer Molar Ratio | Addition Level | Paper-making pH | Wet Tensile (% of Standard) | Percent Wet-Strength Decay | Dry Tensile (% of Standard) |
|---|---|---|---|---|---|---|
| Poly(AA-co-DMEMA-co-MAPTAC) | 25:50:25 | 0.5% | 5.5 | 106 | 65 | 106 |
| Poly(AA-co-DMEMA-co-MAPTAC) | 25:50:25 | 1.0% | 5.5 | 120 | 64 | 120 |
| Mixture of Poly(MAA-co-DMEMA-co-MTMAC) Poly(MAA-co-DMEMA-co-MTMAC) | 20:50:30 30:50:20 | 0.25% 0.25% | 5.5 | 108 | 59 | 108 |
| Poly(MAA-co-DMEMA-co-MTMAC) | 20:50:30 | 0.5% | 5.5 | 98 | 58 | 108 |
| Poly(MAA-co-DMEMA-co-MTMAC) | 20:50:30 | 1.0% | 5.5 | 100 | 55 | 108 |
| Poly(MAA-co-DMEMA-co-MTMAC) | 30:50:20 | 1.0% | 5.5 | 87 | 63 | 101 |
| Mixture of Poly(MAA-co-DMEMA-co-MTMAC) Poly(MAA-co-DMEMA-co-MTMAC) | 20:40:40 40:40:20 | 0.25% 0.25% | 5.5 | 104 | 57 | 100 |
| Poly(MAA-co-DMEMA-co-MTMAC) | 20:40:40 | 0.5% | 5.5 | 69 | 52 | 93 |
| Poly(MAA-co-DMEMA-co-MTMAC) | 20:40:40 | 1.0% | 5.5 | 64 | 55 | 93 |
| Poly(MAA-co-DMEMA-co-MTMAC) | 40:40:20 | 1.0% | 5.5 | 40 | 62 | 85 |
| Poly(MAA-co-DMEMA-co-MTMAC) | 30:30:40 | 0.5% | 5.5 | 76 | 59 | 92 |
| Poly(MAA-co-DMEMA-co-MTMAC) | 30:30:40 | 1.0% | 5.5 | 88 | 59 | 103 |
| BRG Starch | — | 0.5% | 5.5 | 53 | 68 | 94 |
| BRG Starch | — | 1.0% | 5.5 | 57 | 72 | 108 |
| Parez 631NC | — | 0.5% | 5.5 | 77 | 50 | 99 |
| Parez 631NC | — | 1.0% | 5.5 | 86 | 46 | 109 |
| Poly(AA-co-DMEMA-co-MAPTAC) | 25:50:25 | 1.0% | 7.5 | 113 | 52 | 124 |
| BRG Starch | — | 1.0% | 7.5 | 46 | 64 | 105 |
| Parez 631NC | — | 1.0% | 7.5 | 39 | 41 | 97 |

Standard is paper made with Kymene® 557H wet-strength resin at an equal dosage at papermaking pH of 7.5.

Figure 2A:
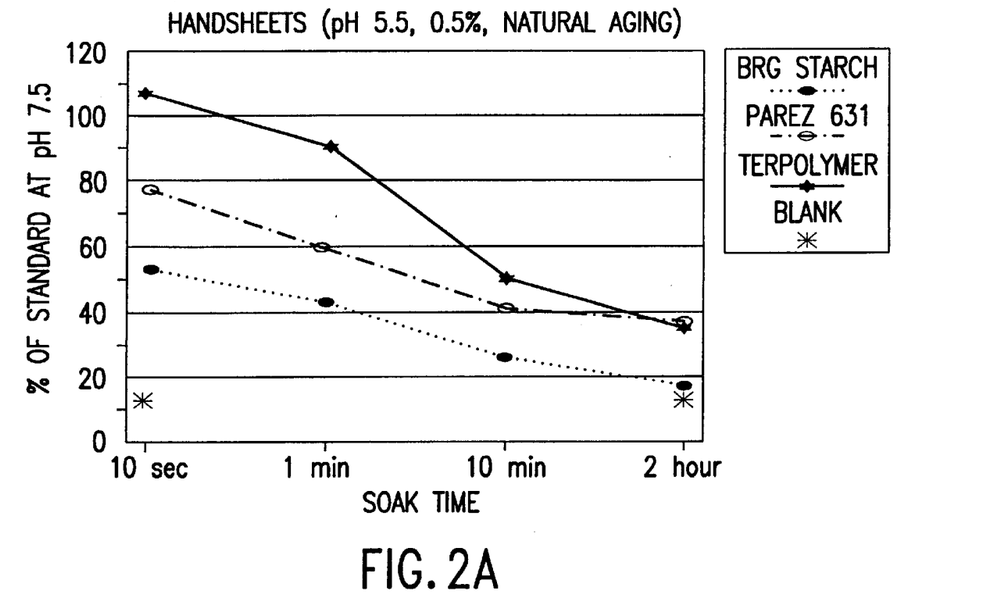
Figure 2B:
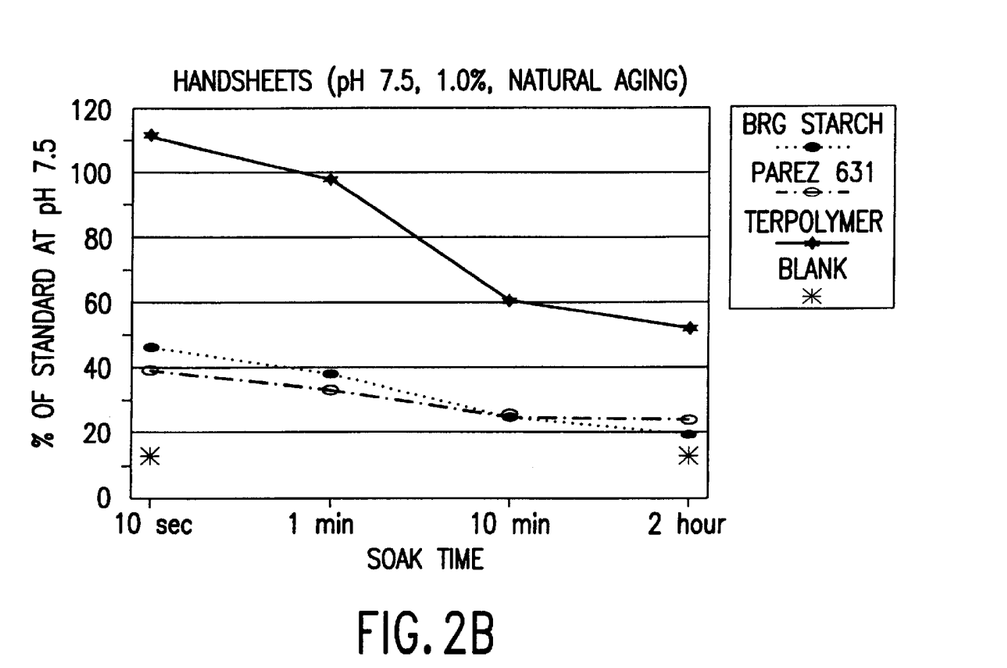

The results from the Table and FIG. 2 show that the resins of this invention have higher initial wet strength performance than the two commercial resins. The amphoteric polymers also have a significantly better wet strength decay than Parez 631NC wet-strength resin. It has been found that at alkaline papermaking conditions, pH 7.5, performance of the amphoteric polymers, Parez 631NC wet-strength resin and Cobond 1000 starch, was worse, the effectiveness and the decay were lower. However, the amphoteric polymers had better performance than the two commercial resins.

It has been found that mixtures of the amphoteric polymers had good performance (see Table). These mixtures were prepared in situ by first adding one amphoteric polymer having the first listed monomer mole ratio to the pulp slurry followed by addition of a second amphoteric polymer having the second listed monomer mole ratio.

EXAMPLE 6

Liquid Packaging Board Dry-strength Evaluation of Activated Amphoteric Aldehyde Resins This example describes the effectiveness of the polymers as dry-strength resins in liquid packaging board applications. The amphoteric aldehyde polymer of this example was prepared and activated as in example 5 except that the solvent was 2% isopropanol in water. The monomer composition was; methacrylic acid (30 mole %), DMEMA (50 mole %) and MTMAC (20 mole %).

Paper handsheets were prepared from 50:50 Rayonier bleached Kraft:James River bleached hardwood Kraft dry lap pulp refined to 505 mL CSF at pH 7.5. Sheets were produced as in Example 5 and were generated having 80 lb/3000 sq. ft. basis weight containing 1–3 components; Kymene® 557H wet-strength resin, Hercobond® 2000 dry-strength resin (available from Hecules Incorporated, Wilmington, Del.) and the amphoteric aldehyde polymer. Handsheets were wet pressed to 30% solids and dried on a drum drier at 240° C. for two passes at 55 seconds per pass. The paper was allowed to age for two weeks at standard temperature and humidity before testing.

Figure 3A:
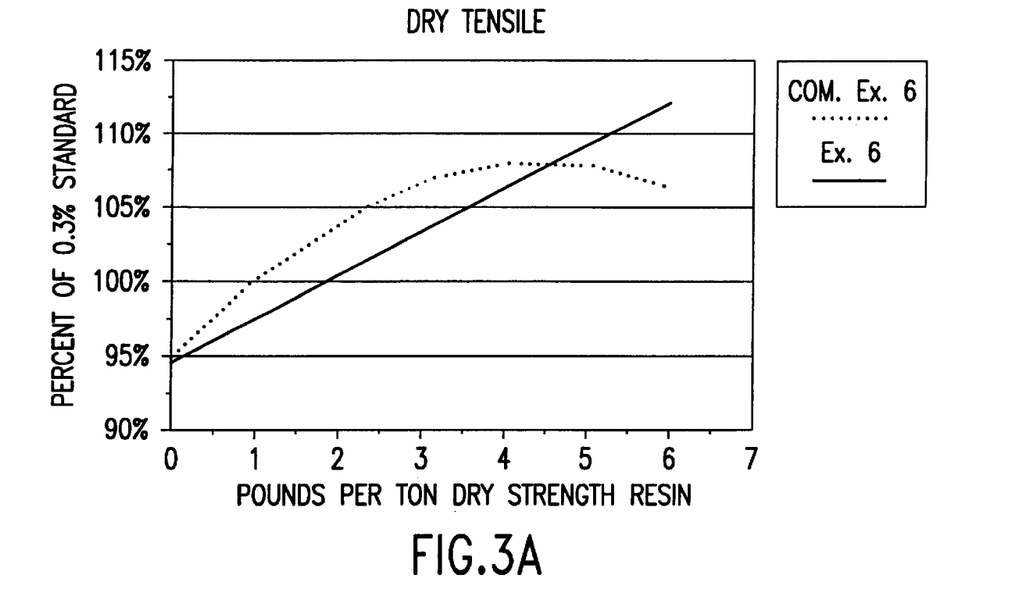
Figure 3B:
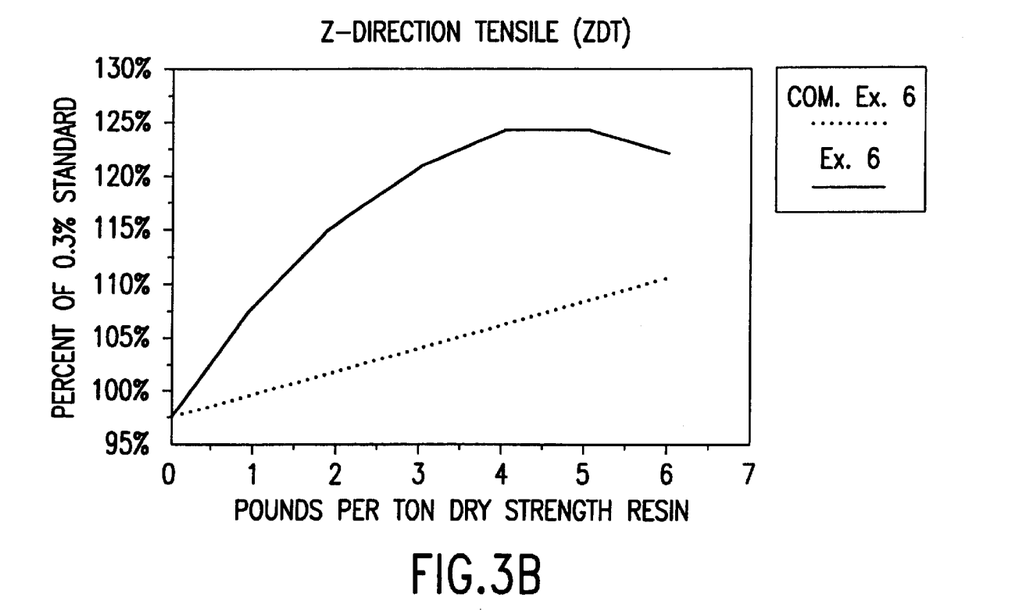

Regression results of the dry-strength of the paper are shown in the graphs which comprise FIG. 3. Example 6 was the amphoteric aldehyde polymer of the invention with 0.3% of Kymene® 557H wet-strength resin and comparative example 6 was Hercobond® 2000 dry-strength resin with 0.3% Kymene® 557H wet-strength resin. From these graphs, it can be seen that at higher addition levels, the combination of the inventive polymer with 0.3% Kymene® 557H wet-strength resin produced paper with higher dry-tensile strength when compared to the combination of Hercobond® 2000 dry-strength resin with Kymene® 557H wet-strength resin.

Also in FIG. 3, the inventive polymer was found to provide up to 18% greater Z-direction tensile strength ("ZDT") when compared to the combination of Hercobond® 2000 dry-strength resin with Kymene® 557H wet-strength resin. Z-direction tensile strength ("ZDT") was determined using TAPPI Method T-541.

The regression results are as follows. The regression uses reduced value of the variables. The ranges for the amphoteric aldehyde polymer (Res) and the Hercobond® 2000 dry-strength resin (HB) are 0 to 0.3% and 0.1 to 0.5% for the Kymene® 557H wet-strength resin (Kym). The models for this example are as follows:

Dry tensile (percent of Kymene® 557H wet-strength resin)/$100 = 1.094 + 0.147 \times Kym + 0.114 \times Kym \times HB - 0.058 \times HB \times Polymer - 0.061 \times HB^2 + 0.028 \times Res$: $r^2 = 94.1\%$ Mullen (percent of blank)/$100 = 1.167 = 0.143 \times Starch = 0.039 \times Resin$ $r^2 = 91.5\%$ Ring Crush (percent of blank)/$100 = 1.303 + 0.125 \times Starch + 0.067 \times Resin - 0.065 \times Alum^2$ $r^2 = 85.3\%$ Tensile (percent of blank)/$100 = 1.110 + 0.0867 \times Starch - 0.043 \times Resin^2 + 0.0283 \times Resin + 0.0252 \times Alum + 0.027 Alum^2$ $r^2 = 94.9\%$ The results for the models of Mullen and Ring Crush Strength are found in the following tables.

| % resin | no starch/no alum | no starch/0.5% alum | 1.0% starch/no alum | 1.0% starch/0.5% alum | 1.5% starch/no alum | 1.5% starch/0.5% alum |
|---|---|---|---|---|---|---|
| Ring Crush (% of blank) | | | | | | |
| 0 | 104.6% | 111.1% | 121.3% | 127.8% | 129.6% | 136.1% |
| 0.1 | 109.1% | 115.6% | 125.7% | 132.2% | 134.1% | 140.6% |
| 0.2 | 113.5% | 120.0% | 130.2% | 136.7% | 138.5% | 145.0% |
| 0.3 | 118.0% | 124.5% | 134.7% | 141.2% | 143.0% | 149.5% |
| Mullen Burst (% of blank) | | | | | | |
| 0 | 98.5% | 98.5% | 117.6% | 117.6% | 127.1% | 127.1% |
| 0.1 | 101.1% | 101.1% | 120.2% | 120.2% | 129.7% | 129.7% |
| 0.2 | 103.7% | 103.7% | 122.8% | 122.8% | 132.3% | 132.3% |
| 0.3 | 106.3% | 106.3% | 125.4% | 125.4% | 134.9% | 134.9% |

ZDT (percent of Kymene® 557H wet-strength resin)/$100 = 1.211 + 0.207 \times Kym - 0.111 \times Res^2 + 0.058 \times Res + 0.062 \times Kym \times Res - 0.064 \times HB \times Res + 0.051 Kym \times HB$: $r^2 97.0\%$

EXAMPLE 7

Recycled Liner Board Dry-strength Evaluation of Activated Amphoteric Aldehyde Resins This example describes the effectiveness of the inventive polymers as dry-strength resins in recycled liner board applications.

In this example, the resin of example 6 was added to paper handsheets produced as in Example 5 having 80 lb/3000 sq. ft. basis weight. The handsheets were made from 100% old corrugated containers (OCC) refined to 400 mL CSF. Additives were added to the proportioner at a pulp solids of 0.5%. The handsheets were made at a basis weight of 80 pounds and wet pressed to 30% solids before being dried on a drum dryer. The samples were tested after conditioning.

The regression results are as follows. The regression uses reduced value of the variables. The ranges for cationic starch are 0 to 1.5%, for alum 0 to 1% and for resin from 0 to 0.3%.

The models for this example are as follows:

The above results demonstrate that the inventive polymers effectively increase the Mullen Burst Strength and the Ring Crush of paper with or without the addition of starch and/or alum. Mullen Burst Strength was determined using TAPPI Method T-807, and the Ring Crush of paper was determined using TAPPI Method T-818.

EXAMPLE 8

Newsprint Dry-strength Evaluation of Activated Amphoteric Aldehyde Resins

This example describes the effectiveness of the polymers as dry-strength resins in newsprint applications.

Paper was made on a laboratory former using 95% repulped newsprint and 5% bleached softwood kraft as the furnish. Fifteen percent Klondike water white clay, 1% alum, and 0.025% cationic polyacrylamide retention aid were added, and the pH was adjusted to 4.5 with sulfuric acid.

Two different amphoteric AA:DMEMA:MAPTAC aldehyde resins, having monomer mole ratios of 25:50:25 and 40:30:30, prepared and activated as in example 5, were evaluated on a lab former. The results of this evaluation are found in the following table:

| Monomer Molar Ratio | Amount % | Basis Weight lbs/ream | Caliper mils | Mullen Burst Strength | | Tensile Strength, MD | | Tensile Energy Absorption | |
|---|---|---|---|---|---|---|---|---|---|
| | | | | psi | % Improvement | lb/ in width | % Improvement | In lb/ sq in | % Improvement |
| Blank | | 26.1 | 3.3 | 5.92 | | 5.50 | | 0.019 | |
| 25:50:25 | 0.2 | 25.8 | 3.4 | 6.58 | 11 | 5.99 | 9 | 0.023 | 21 |
| 25:50:25 | 0.4 | 25.6 | 3.4 | 7.26 | 23 | 6.45 | 17 | 0.026 | 37 |
| 40:30:30 | 0.2 | 26.1 | 3.4 | 5.94 | 0 | 6.88 | 25 | 0.028 | 47 |
| 40:30:30 | 0.4 | 26.4 | 3.4 | 7.88 | 33 | 7.32 | 33 | 0.033 | 73 |

At a 0.4% addition level, the amphoteric aldehyde polymers improved dry Mullen burst by 23–33% and dry tensile by 17–33% compared to the blank. Paper samples were tested using TAPPI Standard Test Method T403 "Bursting Strength of Paper". Basis Weight of paper was determined using TAPPI Method T-410. Caliper of paper was determined using TAPPI Method T-411. Improvement in strength properties of newsprint allows for newsprint be made with reduced basis weight but with comparable strength.

EXAMPLE 9

Light Weight Coated Basepaper Dry-Strength Evaluation of Activated Amphoteric Aldehyde Resins This example relates to the application of the polymers in light weight coated (LWC) paper grades. LWC paper is a printing grade characterized by the presence of a bright and glossy coating of light pigment particles. The grammage for this grade ranges from 47 to 103 $gm^{-2}$ of which 20 to 30% of the weight may be due to the coating. This example describes of effectiveness of the polymer for improving the dry-strength properties of basesheet prior to coating. The resin of example 9 was prepared as in example 4A and activated according to example 3 with the exception that the process volumes were increased over those in example 4A by a factor of twelve. The resulting resin had a RSV of 0.911 dL/g and a $M_W$ of 225,000 Daltons.

50 $gm^{-2}$ handsheets were made on a Noble and Wood handsheet machine. The furnish was a blend of dry-lap ECF bleached softwood kraft pulp (SWK), which had been beaten in a controlled bed-plate beater (Tappi method T-200) to a Schopper-Riegler value of 27° SR (ISO 5267/1), and dry lap thermomechanical pulp (TMP), which had been beaten in a controlled bed-plate beater (Tappi method T-200) to a Schopper-Riegler value of 40° SR (ISO 5267/1). The pH was adjusted to a value of 7.0. After addition of the activated resin, (Queensfill™ 300 chalk, available from ECC International), was added such that 5% of the weight of the uncoated sheet was filler. The initial wet mats formed were consolidated by pressing to 30% solids and the subsequent wet webs dried by contact with a drum drier. The surface temperature of the drum drier was 105° C., and the time of contact with the drier was thirty seconds. The final moisture content of the sheets was between 4–5%. The resin was added, on a dry basis, at 0.25% and 0.50% to dry fiber to furnishes which had a 70:30 weight ratio of TAP:SWK and a 80:20 weight ratio of TMP:SWK. These prepared sheets were compared against sheets containing no resin but with higher levels of SWK fiber.

All sheets were allow to age for one week under standard temperature and humidity conditions (Tappi method T-402) and were then evaluated for dry tensile strength, stretch and TEA (Tappi method T-494); wet tensile strength, stretch and TEA (Tappi method T-494) after soaking in demineralised water for one minute; dry Elmendorf tear strength (Tappi method T-414) and dry fracture toughness using the method of 'Essential Work of Ductile Fracture' as outlined in *Tappi J.* 76(2): 109(1993) and *Tappi J.* 78(10):177(1995), the contents thereof are incorporated herein by reference. The results are given in the table below.

| No | TMP:SWK ratio | % db resin | Dry-strength Properties | | | | | | Wet-strength Properties | | |
|---|---|---|---|---|---|---|---|---|---|---|---|
| | | | Tear/ mN | $w_a$/ $kJm^{-2}$ | $\beta w_p$/ $kJm^{-3}$ | tensile/ $kNm^{-1}$ | stretch % | TEA/ $Jm^{-2}$ | tensile/ $kNm^{-1}$ | stretch % | TEA/ $Jm^{-2}$ |
| 1 | 50:50 | — | 660 | 3.727 | 66.756 | 1.812 | 1.80 | 20.2 | 0.040 | 1.12 | 0.34 |
| 2 | 60:40 | — | 600 | 2.779 | 47.293 | 1.661 | 1.85 | 18.3 | 0.045 | 1.11 | 0.38 |
| 3 | 70:30 | — | 495 | 2.072 | 33.504 | 1.273 | 1.69 | 13.0 | 0.047 | 1.21 | 0.43 |
| 4 | 70:30 | 0.25 | 565 | 2.996 | 53.266 | 1.605 | 2.00 | 21.0 | 0.225 | 3.05 | 4.72 |
| 5 | 70:30 | 0.50 | 470 | 3.002 | 66.619 | 1.723 | 1.92 | 20.7 | 0.276 | 3.07 | 5.54 |
| 6 | 80:20 | — | 415 | 1.545 | 23.736 | 1.078 | 1.39 | 8.8 | 0.036 | 1.02 | 0.28 |
| 7 | 80:20 | 0.25 | 455 | 2.378 | 30.278 | 1.483 | 1.79 | 16.6 | 0.214 | 3.19 | 4.81 |
| 8 | 80:20 | 0.50 | 460 | 2.429 | 44.095 | 1.603 | 1.76 | 17.5 | 0.288 | 3.06 | 5.82 |

The data clearly demonstrates that example number 4, a basepaper containing the polymer, has improved strength properties compared the example number 3, a basepaper with the same TMP:SWK ratio but containing no polymer. The improvement in strength properties can be gauged by comparison with example numbers 1 and 2, which are basepapers containing much higher levels SWK fiber but no polymer. Likewise, the strength properties of example number 7, a different basepaper containing polymer, are much higher than example number 6, a basepaper with the same TMP:SWK ratio but containing no polymer.

EXAMPLE 10

Light Weight Coated Basepaper Dry-Strength Evaluation of Activated Amphoteric Aldehyde Resins of different Molecular Weights This example relates to the application of the polymers, with different molecular weights, in light weight coated (LWC) paper grades. The resin of example 10 was prepared according to example 2 except that the mass of the different monomers and reagents used were increased so that the initial reaction solids were 35.0%. The aqueous phase was still 2% isopropanol ("IPA"). Six (6) hours after the addition of the initiator, the reaction mixture was cooled and water was added to give 15% resin solids. The molecular weight of final resin was $M_W$=550,000 Daltons. The resin was activated according to Example 3.

Resins of examples 9 and 10 were evaluated in a hand-sheets made from one furnish which had a 70:30 weight ratio of TMP:SWK and a second furnish which had a 80:20 weight ratio of TMP:SWK. The handsheets were prepared and tested according to the methods and procedures described in example 9.

| No | TMP:SWK ratio | Resin | % db | Dry-strength Properties ||||||| Wet-strength Properties |||
|---|---|---|---|---|---|---|---|---|---|---|---|---|
| | | | | Tear/ mN | $w_a$/ kJm$^{-2}$ | $\beta w_p$/ kJm$^{-3}$ | tensile/ kNm$^{-1}$ | stretch % | TEA/ Jm$^{-2}$ | tensile/ kNm$^{-1}$ | stretch % | TEA/ Jm$^{-2}$ |
| 1 | 70:30 | 9  | 0.25 | 565 | 3.065 | 49.844 | 1.548 | 2.00 | 21.0 | 0.215 | 3.06 | 4.72 |
| 2 | 70:30 | 9  | 0.50 | 470 | 3.075 | 62.915 | 1.712 | 1.92 | 20.7 | 0.274 | 3.07 | 6.64 |
| 3 | 70:30 | 10 | 0.25 | 630 | 3.442 | 42.458 | 1.684 | 2.06 | 23.8 | 0.276 | 3.60 | 6.94 |
| 4 | 70:30 | 10 | 0.60 | 470 | 3.412 | 77.790 | 1.949 | 2.32 | 31.2 | 0.413 | 4.16 | 11.43 |
| 5 | 80:20 | 9  | 0.25 | 455 | 2.388 | 29.887 | 1.429 | 1.79 | 16.6 | 0.209 | 3.19 | 4.81 |
| 6 | 80:20 | 9  | 0.50 | 460 | 2.617 | 32.620 | 1.572 | 1.76 | 17.6 | 0.278 | 3.06 | 5.82 |
| 7 | 80:20 | 10 | 0.25 | 480 | 2.384 | 40.780 | 1.526 | 1.93 | 19.7 | 0.258 | 3.36 | 6.17 |
| 8 | 80:20 | 10 | 0.50 | 470 | 3.527 | 16.842 | 1.591 | 1.89 | 19.2 | 0.397 | 3.99 | 10.87 |

In the handsheets with a 70:30 weight ratio of TMP:SWK, comparing set number 1 with set number 3, and set number 2 with set number 4, the data clearly demonstrates that better dry-strength properties are attained with Resin 10, $M_W$=550,000 Daltons, RSV 2.128 dL/g than with Resin 9, $M_W$=225,000 Daltons, RSV 0.911 dL/g.

In the handsheets with a 80:20 weight ratio of IMP:SWK, comparing set number 5 with set number 7, and set number 6 with set number 8, the data again clearly demonstrates that better dry-strength properties are attained with Resin 10 than with Resin 9. Resin 10 demonstrates the ability to modify the molecular weight of a resin by varying the reaction solids of the product, thereby modifying the dry strength properties of paper containing these resins.

It is not intended that the examples presented here should be construed to limit the invention, but rather they are submitted to illustrate some of the specific embodiments of the invention. Various modifications and variations of the present invention can be made without departing from the scope of the appended claims.

What is claimed is:

1. A resin comprising:
an amphoteric polymer produced through polymerization of an anionic monomer, a monomer containing aldehyde functionality and a cationic monomer wherein the amphoteric polymer comprises a monomer mole ratio of anionic monomer to monomer containing aldehyde functionality to cationic monomer of about 5–50:10–80:5–50.

2. The resin of claim 1 wherein the amphoteric polymer comprises a monomer mole ratio of anionic monomer to monomer containing aldehyde functionality to cationic monomer of about 10–40:20–60:10–40.

3. The resin of claim 2 wherein the amphoteric polymer comprises a monomer mole ratio of anionic monomer to monomer containing aldehyde functionality to cationic monomer of about 25:50:25.

4. The resin of claim 1 wherein the anionic monomer is selected from the group consisting of acrylic acid, methacrylic acid, acrylamidopropane sulfonic acid (AMPS), maleic acid, fumaric acid and itaconic acid and salts thereof.

5. The resin of claim 1 wherein the anionic monomer is selected from the group consisting of acrylic acid, methacrylic acid, maleic acid, fumaric acid and itaconic acid and salts thereof.

6. The resin of claim 4 wherein the salts of the anionic monomers are their sodium or potassium salts.

7. The resin of claim 1 wherein the anionic monomer comprises acrylic acid.

8. The resin of claim 1 wherein the anionic monomer comprises methacrylic acid.

9. The resin of claim 1 wherein the monomer which contains aldehyde functionality has the structure where "R'" may be either H or methyl, "R''" may independently be methyl, ethyl or alkyl, "X" may be either or —O—, "R" may be H, methyl or alkyl, and "n" may be 1 to 8.

10. The resin of claim 9 wherein "R''" comprises H.

11. The resin of claim 1 wherein the monomer which contains aldehyde functionality is selected from the group consisting of acrolein, methacrolein, 3,3-dimethyloxypropyl acrylamide, 3,3-diethoxypropyl acrylamide, 3,3-dimethoxypropyl methacrylamide, 2,2-dimethoxy-1-methylethyl acrylate, 3,3-dimethoxypropyl methacrylate, 2-(acryloylamino)-ethanol dimethylacetal, 3-(methacryloylamino)propanal dimethyl acetal, 3-(acryloylamino)propanal dimethyl acetal, and 8-(acryloylamino)octanal dimethylacetal, acrylamidobutyraldehyde diethylacetal, acrylamidobutyraldehyde dimethylacetal, N-(2,2-dimethoxyethyl) methacrylamide, N-(2,2-dimethoxyethyl)-N-methyl-methacrylamide, 2,2-dimethoxyethyl-methacrylate, and 2,2-diethoxyethyl-methacrylate.

12. The resin of claim 1 wherein the monomer which contains aldehyde functionality comprises N-(2,2-dimethoxyethyl)-N-methylacrylamide (DMEMA).

13. The resin of claim 1 wherein the cationic monomer represented by the following structure where "R'" may be either H or methyl, "R''" may independently be H, methyl, ethyl or alkyl, "X" may be either —O—, "R" may be H, methyl or alkyl, "n" may be 1 to 8 and "Z" represents an anionic counter ion associated with the cationic monomer.

14. The resin of claim 13 wherein "Z$^-$" is selected from the group consisting of Cl$^-$, Br$^-$, I$^-$, NO$_3^-$, CH$_3$OSO$_3^-$, HSO$_4^-$, and ClO$_4^-$.

15. The resin of claim 13 wherein "Z$^-$" comprises Cl$^-$.

16. The resin of claim 1 wherein the cationic monomer may be selected from the group consisting of [2-(methacryloyloxy)ethyl]trimethylammonium chloride (MTMAC), Dimethylaminoethyl methacrylate (DMEAMA), dimethylaminopropyl methacrylamide (DMAPMA), [3-(methacryloylamino)propyl] trimethylammonium chloride MAPTAC ), diallyldimethylammonium chloride (DADMAC), acryloyloxyethyltrimethylammonium chloride, and [2-(methacryloyloxy)ethyl] trimethylammomium methylsulfate.

17. The resin of claim 1 wherein the cationic monomer comprises [2-(methacryloyloxy)ethyl]trimethylammonium chloride (MAC).

18. The resin of claim 1 wherein the cationic monomer comprises [3-(methacryloylamino)propyl] trimethylammonium chloride MAPTAC).

19. The resin of claim 1 wherein the resin has a reduced specific viscosity value of less than about 1.5 dL/g.

20. The resin of claim 19 wherein the resin has a reduced specific viscosity value of between about 0.5 to about 1.5 dL/g.

21. The resin of claim 20 wherein the resin has a reduced specific viscosity value of between about 0.6 to about 1.2 dL/g.

22. The resin of claim 1 wherein the resin has a molecular weight in the range of from about 50,000 to about 2,000,000 M$_W$.

23. The resin of claim 22 wherein the resin has a molecular weight in the range of from of about 75,000 to about 500,000 M$_W$.

24. The resin of claim 23 wherein the resin has a molecular weight in the range of from of about 150,000 to about 350,000 M$_W$.

25. The resin of claim 22 wherein the resin has a molecular weight in the range of from of about 100,000 to about 1,000,000 M$_W$.

26. The resin of claim 25 wherein the resin has a molecular weight in the range of from of about 400,000 to about 700,000 M$_W$.

27. The resin of claim 2 wherein the anionic monomer is selected from the group consisting of acrylic acid, methacrylic acid, acrylamidopropane sulfonic acid (AMPS), maleic acid, fumaric acid and itaconic acid and salts thereof.

28. The resin of claim 27 wherein the salts of the anionic monomers are their sodium or potassium salts.

29. The resin of claim 27 wherein the anionic monomer comprises acrylic acid.

30. The resin of claim 27 wherein the anionic monomer comprises methacrylic acid.

31. The resin of claim 27 wherein the monomer which contains aldehyde functionality has the structure where "R'" may be either H or methyl, "R''" may independently be H, methyl, ethyl or alkyl, "X" may be either or —O—, "R" may be H, methyl or alkyl, "n" may be 1 to 8.

32. The resin of claim 31 wherein "R" comprises H.

33. The resin of claim 27 wherein the monomer which contains aldehyde functionality is selected from the group consisting of acrolein, methacrolein, 3,3-dimethyloxypropyl acrylamide, 3,3-diethoxypropyl acrylamide, 3,3-dimethoxypropyl methacrylamide, 2,2-dimethoxy-1-methylethyl acrylate, 3,3-dimethoxypropyl methacrylate, 2-(acryloylamino)-ethanol dimethylacetal, 3-(methacryloylamino)propanal dimethyl acetal, 3-(acryloylamino)propanal dimethyl acetal, and 8-(acryloylamino)octanal dimethylacetal, acrylamidobutyraldehyde diethylacetal, acrylamidobutyraldehyde dimethylacetal, N-(2,2-dimethoxyethyl) methacrylamide, N-(2,2-dimethoxyethyl)-N-methyl-methacrylamide, 2,2-dimethoxyethyl-methacrylate, and 2,2-diethoxyethyl-methacrylate.

34. The resin of claim 27 wherein the monomer which contains aldehyde functionality comprises N-(2,2-dimethoxyethyl)-N-methylacrylamide (DMEMA).

35. The resin of claim 34 wherein the cationic monomer may be selected from the group consisting of [2-(methacryloyloxy)ethyl]trimethylammonium chloride (MTMAC), Dimethylaminoethyl methacrylate (DMEAMA), dimethylaminopropyl methacrylamide (DMAPMA), [3-(methacryloylamino)propyl] trimethylammonium chloride (MAPTAC), diallyldimethylammonium chloride (DADMAC), acryloyloxyethyltrimethylammonium chloride, and [2-(methacryloyloxy)ethyl] trimethylammomium methylsulfate.

36. The resin of claim 34 wherein the cationic monomer comprises [2-(methacryloyloxy)ethyl]trimethylammonium chloride (MAPTAC).

37. The resin of claim 34 wherein the cationic monomer comprises [3-(methacryloylamino)propyl] trimethylammonium chloride (MAPTAC).

38. A process for producing an amphoteric polymer comprising the steps of:
  a) providing an anionic monomer, a monomer containing aldehyde functionality and a cationic monomer to a reactor,
  b) adding a water-soluble initiator to the reactor, and
  c) permitting the anionic monomer, the monomer containing aldehyde functionality and the cationic monomer to polymerize to produce an amphoteric polymer, wherein the amphoteric polymer comprises a mole ratio of anionic monomer to monomer containing aldehyde functionality to cationic monomer of about 5–50:10–80:5–50.

39. The process of claim 38 further comprising the step of:
  d) adding a chain transfer agent to the reactor.

40. The process of claim 39 wherein the chain transfer agent is selected from the group consisting of beta-mercaptoethanol, 1-dodecanethiol, 1,2-propanediol, thioglycolic acid, glycerol, acetone, and isopropanol.

41. The process of claim 39 wherein the chain transfer agent is selected from the group consisting of beta-mercaptoethanol, glycerol, 1,2-propanediol, and isopropanol.

42. The process of claim 39 wherein the claim transfer agent comprises isopropanol.

43. The process of claim 39 wherein the chain transfer agent comprises about 1% to about 30% isopropanol in water.

44. The process of claim 43 wherein the chain transfer agent comprises about 1% to about 10% isopropanol in water.

45. The process of claim 44 wherein the chain transfer agent comprises about 2% to about 5% isopropanol in water.

46. The process of claim 38 wherein the anionic monomer, the monomer containing aldehyde functionality and the cationic monomer are permitted to polymerize at a pH of about 4 to about 8.

47. The process of claim 46 wherein the anionic monomer, the monomer containing aldehyde functionality and the cationic monomer are permitted to polymerize at a pH of about 5 to about 7.

48. The process of claim 38 wherein the water-soluble initiator comprises 2,2'-azobis(2-methylpropionamidine) dihydrochloride.

* * * * *